United States Patent
Chen et al.

(10) Patent No.: US 12,328,191 B2
(45) Date of Patent: Jun. 10, 2025

(54) RESOURCE DETERMINING METHOD AND COMMUNICATIONS DEVICE

(71) Applicant: VIVO MOBILE COMMUNICATION CO., LTD., Guangdong (CN)

(72) Inventors: Xiaohang Chen, Guangdong (CN); Peng Sun, Guangdong (CN); Xiaodong Shen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 449 days.

(21) Appl. No.: 17/703,409

(22) Filed: Mar. 24, 2022

(65) Prior Publication Data

US 2022/0216951 A1 Jul. 7, 2022

Related U.S. Application Data

(63) Continuation of application No. PCT/CN2020/118066, filed on Sep. 27, 2020.

(30) Foreign Application Priority Data

Sep. 27, 2019 (CN) .......................... 201910927105.4

(51) Int. Cl.
*H04L 1/1812* (2023.01)
*H04W 72/23* (2023.01)

(52) U.S. Cl.
CPC ........... *H04L 1/1812* (2013.01); *H04W 72/23* (2023.01)

(58) Field of Classification Search
CPC ... H04L 1/1812; H04L 1/1854; H04L 1/1864; H04L 1/1861; H04L 5/00; H04L 5/0053; H04L 5/0055; H04L 5/0094; H04L 5/0007; H04W 72/23; H04W 72/12; H04W 74/0833
See application file for complete search history.

(56) References Cited

U.S. PATENT DOCUMENTS

| | | |
|---|---|---|
| 2014/0126491 A1 | 5/2014 | Ekpenyong et al. |
| 2014/0293909 A1 | 10/2014 | Xu et al. |
| 2015/0215081 A1 | 7/2015 | Chae et al. |
| 2019/0159251 A1 | 5/2019 | Li et al. |

(Continued)

FOREIGN PATENT DOCUMENTS

| | | |
|---|---|---|
| CN | 102271032 A | 12/2011 |
| CN | 107332646 A | 11/2017 |

(Continued)

OTHER PUBLICATIONS

Intel Corporation, Pucch resource allocation before RRC connection, 3GPP TSG RAN WG1 Meeting #92, R1-1802413, Feb. 26-Mar. 2, 2018, Athens, Greece.

(Continued)

*Primary Examiner* — Diane L Lo
(74) *Attorney, Agent, or Firm* — Price Heneveld LLP

(57) ABSTRACT

A resource determining method and a communications device are provided. The method includes: determining, based on first resource information and second resource information, a resource for a hybrid automatic repeat request HARQ feedback for downlink transmission; where the first resource information is any one of the following: a first target resource and a first resource set, where the first resource set includes at least two resources.

20 Claims, 2 Drawing Sheets

(56) References Cited

U.S. PATENT DOCUMENTS

| | | | |
|---|---|---|---|
| 2020/0366418 A1 | 11/2020 | Zhuo et al. | |
| 2020/0366445 A1 | 11/2020 | Takeda et al. | |
| 2023/0269777 A1* | 8/2023 | Lee .................. | H04W 52/14 370/329 |

FOREIGN PATENT DOCUMENTS

| | | |
|---|---|---|
| CN | 108075864 A | 5/2018 |
| CN | 109586857 A | 4/2019 |
| CN | 109802763 A | 5/2019 |
| CN | 110034866 A | 7/2019 |
| EP | 3471488 A1 | 4/2019 |
| WO | 2014051508 A1 | 4/2014 |
| WO | 2018169937 A1 | 9/2018 |
| WO | 2019099670 A1 | 5/2019 |
| WO | 2019102062 A1 | 5/2019 |
| WO | 2019138555 A1 | 7/2019 |

OTHER PUBLICATIONS

Oppo, On eMBB and URLLC data differentiation, 3GPP TSG RAN WG1 Meeting #94, R1-1808889, Aug. 20-24, 2018, Gothenburg, Sweden.

Nokia, Nokia Shanghai Bell, Remaining details on NR Physical UL Control Channel, 3GPP TSG RAN WG1 Meeting #94, R1-1808966, Aug. 20-24, 2018, Gothenburg, Sweden.

Mediatek Inc., Enhancements to HARQ for NR-U operation, 3GPP TSG RAN WG1 #96bis, R1-1904484, Apr. 8-12, 2019, Xi'an, China.

Qualcomm Incorporated, Enhancements to Scheduling and HARQ operation for NR-U, 3GPP TSG RAN WG1 Meeting #97, R1-1907263, May 13-May 17, 2019, Reno, US.

Samsung, Harq enhancements for NR-U, 3GPP TSG RAN WG1 #98, R1-1908467, Aug. 26-30, 2019, Prague, CZ.

Intel Corporation, "On remaining details of procedure for 2-step RACH", 3GPP TSG RAN WG1 #99, R1-1912192, Reno, USA, Nov. 18-22, 2019.

LG Electronics, "HARQ procedure for NR-U", 3GPP TSG RAN WG1 #98, R1-1908537, Prague, CZ, Aug. 26-30, 2019.

ZTE, "On the remaining issues of 2-step RACH procedures", 3GPP TSG RAN WG1 Meeting #98, R1-1908182, Prague, CZ, Aug. 26-30, 2019.

Oppo, "UCI enhancements for URLLC", 3GPP TSG RAN WG1 Ad-Hoc Meeting 1901, R1-1900282, Taipei, Jan. 21-25, 2019.

Nokia, "Remaining details on RACH procedure", 3GPP TSG RAN WG1 Meeting RAN1#92, R1-1802022, Athens, Greece, Feb. 26-Mar. 2, 2018.

Lg Electronics, "Considerations on HARQ process and feedback for NR", 3GPP TSG RAN WG1 Meeting #90bis, R1-1717966, Prague, CZ, Oct. 9-13, 2017.

Vivo, "Remaining issues on HARQ management for eMBB", 3GPP TSG RAN WG1 Meeting #93, R1-1806068, Busan, Korea, May 21-25, 2018.

Huawei, Hisilicon, Remaining issues on NR CA, 3GPP TSG RAN WG1 Meeting #93, R1-1805895, May 21-25, 2018, Busan, Korea.

CAICT, UCI enhancements for URLLC, 3GPP TSG RAN WG1 Meeting #96bis, R1-1905132, Apr. 8-Apr. 12 2019, Xi'an, China.

CMCC, Discussion on UCI enhancements for URLLC, 3GPP TSG RAN WG1 #98, R1-1908867, Aug. 26-30, 2019, Prague, CZ.

NTT Docomo, Inc., "Resource allocation for PUCCH", 3GPP TSG-RAN WG1 Meeting #93, R1-1807065, Busan, Korea, May 21-25, 2018.

Oppo, "Summary of offline discussion on PUCCH resource allocation", 3GPP TSG RAN WG1 Meeting #93, R1-1807863, Busan, Korea, May 21-25, 2018.

Huawei, Hisilicon, "Discussion on 2-step RACH procedure", 3GPP TSG RAN WG1 Meeting #98, R1-1908034, Prague, Czech Republic, Aug. 26-30, 2019.

* cited by examiner

Determine, based on first resource information and second resource information, a resource for a hybrid automatic repeat request HARQ feedback for downlink transmission; where the first resource information is any one of the following: a first target resource and a first resource set, where the first resource set includes at least two resources — 101

RESOURCE DETERMINING METHOD AND COMMUNICATIONS DEVICE

CROSS-REFERENCE TO RELATED APPLICATIONS

This application is a continuation application of International Application No. PCT/CN2020/118066 filed on Sep. 27, 2020, which claims priority to Chinese Patent Application No. 201910927105.4, filed in China on Sep. 27, 2019, which are incorporated herein by reference in their entireties.

TECHNICAL FIELD

Embodiments of this disclosure relate to the field of communications technologies, and in particular, to a resource determining method and a communications device.

BACKGROUND

Before a terminal establishes a radio resource control (RRC) connection, a downlink transmission is scheduled by using downlink control information (DCI).

A time location of a physical uplink control channel (PUCCH) resource in which a hybrid automatic repeat request acknowledgement (HARQ-ACK) feedback corresponding to the downlink transmission is located is also indicated by the DCI. Specifically, an actual time location is selected from a set of HARQ-ACK timings.

However, in the related art, the foregoing HARQ-ACK timings are default or predefined, such that time locations selectable from the foregoing HARQ-ACK timings are limited. Therefore, in the related art, flexibility in determining a resource for a HARQ-ACK feedback is relatively low.

SUMMARY

Embodiments of this disclosure provide a resource determining method and a communications device.

According to a first aspect, an embodiment of this disclosure provides a resource determining method, applied to a communications device, where the method includes:
  determining, based on first resource information and second resource information, a resource for a hybrid automatic repeat request HARQ feedback for downlink transmission; where
  the first resource information is any one of the following:
  a first target resource; and
  a first resource set, where the first resource set includes at least two resources.

According to a second aspect, an embodiment of this disclosure further provides a communications device, including:
  a first determining module, configured to determine, based on first resource information and second resource information, a resource for a hybrid automatic repeat request HARQ feedback for downlink transmission; where
  the first resource information is any one of the following:
  a first target resource; and
  a first resource set, where the first resource set includes at least two resources.

According to a third aspect, an embodiment of this disclosure further provides a communications device. The communications device includes a processor, a memory, and a computer program stored in the memory and capable of running on the processor, where when the computer program is executed by the processor, the steps of the foregoing resource determining method are implemented.

According to a fourth aspect, an embodiment of this disclosure further provides a computer-readable storage medium, where the computer-readable storage medium stores a computer program, and when the computer program is executed by a processor, the steps of the foregoing resource determining method are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and persons of ordinary skill in the art may derive other drawings from these accompanying drawings without creative efforts.

DESCRIPTION OF EMBODIMENTS

Figures 1, 2:
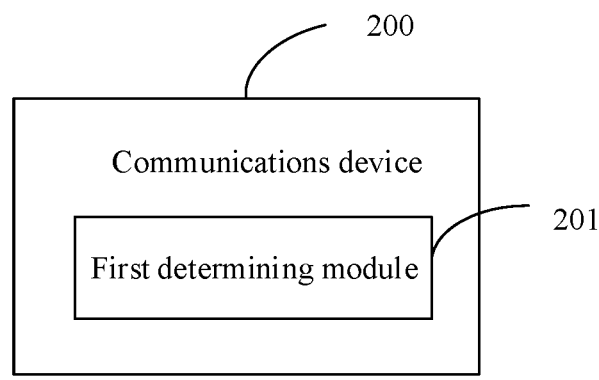
FIG. 1 is a flowchart of a resource determining method according to an embodiment of this disclosure.
FIG. 2 is a first structural diagram of a communications device according to an embodiment of this disclosure.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

The terms "first", "second", and the like in this application are used to distinguish between similar resources instead of describing a specific order or sequence. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. In addition, the use of "and/or" in this application represents presence of at least one of the connected resources. For example, A and/or B and/or C represents the following seven cases: A alone, B alone, C alone, both A and B, both B and C, both A and C, and all of A, B, and C.

For ease of understanding, the following describes some content involved in the embodiments of this disclosure.

I. Preamble

In an uplink transmission mode of the related art, if a terminal (which may be also referred to as user equipment (UE)) needs to send uplink data, firstly uplink timing synchronization needs to be obtained through a random access procedure, that is, the terminal obtains uplink timing advance (TA) information from a network-side device. After the uplink synchronization is obtained, the UE may send the uplink data through dynamic scheduling or semi-static scheduling.

When an uplink data packet is small, the manner of sending the uplink data after the uplink synchronization is obtained through the random access procedure may cause consumption of resources and electric power. Therefore, in a massive machine type of communication (mMTC) scenario, the UE may send uplink data in an unsynchronized state.

Similar to the random access procedure, the UE is also in the unsynchronized state when sending a preamble. Therefore, a cyclic prefix (CP) needs to be added to the preamble to offset an impact of transmission delay. In a specific implementation, the preamble may include a CP and a sequence.

II. 4-Step Random Access Procedure (RACH)

In a 4-step RACH, the UE first sends Msg1 to the network-side device, including a preamble; after detecting the preamble, the network-side device sends Msg2, including a random access response (RAR) message corresponding to the preamble; after receiving the Msg2, the UE sends Msg3 according to an indication in the RAR; after receiving the Msg3, the network-side device sends Msg4, including a contention resolution ID; and when the UE receives the Msg4, the 4-step random access procedure is completed.

III. 2-Step Random Access Procedure (2-Step RACH)

2-Step random access procedure has been introduced in new radio (New Radio, NR).

Specifically, when initiating a random access procedure, the terminal may send a random access message MsgA to the network-side device. The MsgA includes a physical random access channel (PRACH) and a physical uplink data shared channel (PUSCH), where the PRACH carries a preamble, and the PUSCH carries a terminal identifier (UE-ID) and other information. After receiving the MsgA, the network-side device sends MsgB to the terminal, where the MsgB carries an RAR, a Contention Resolution ID, and other information. After the terminal receives the MsgB carrying a Contention Resolution ID corresponding to the terminal, the 2-step random access procedure is completed.

Main application scenarios of the 2-step RACH procedure are scenarios such as small cells, unlicensed bands, or low-complexity terminals. The 2-step RACH procedure may reduce time delay of the random access procedure, signaling overheads required by the random access procedure, power consumption of the terminal in performing the random access procedure, and the like. In addition, in the 2-step RACH procedure, uplink data may be sent at the same time during the random access procedure, for example, uplink data is transmitted in an inactive state or an idle state. For low-power terminals, power consumption can be further reduced.

IV. Hybrid Automatic Repeat Request Acknowledgement Timing (Hybrid Automatic Repeat ReQuest Acknowledgement Timing, HARQ-ACK Timing)

The HARQ-ACK timing is defined as an interval from an occasion when reception of downlink data ends to an occasion when a corresponding positive acknowledgment (ACK)/negative acknowledgment (NACK) is fed back.

NR supports flexible HARQ-ACK timing configurations to adapt to different services and network deployments. Each UE can configure a UE-dedicated HARQ-ACK timing table by using RRC. The table contains a plurality of HARQ-ACK timing values (which are referred to as K1 values), and K1 can be in a unit of slot.

When dynamically scheduling downlink data transmission, a base station may indicate one K1 value in the form of an index in downlink control information (DCI). The K1 value is a value selected from the UE-dedicated HARQ-ACK timing table for notifying the UE of an occasion for feeding back the HARQ-ACK.

If no domain for indicating the HARQ-ACK timing is included in the DCI, the UE can determine an interval from downlink data to the HARQ-ACK feedback by using a fixed value. The fixed value may be indicated by using radio resource control (RRC).

For a downlink (DL) semi-persistent scheduling (SPS) physical downlink shared channel (PDSCH) sent in slot n, its corresponding HARQ-ACK is transmitted in slot (n+K), where K is indicated in the DCI that activated the DL SPS.

V. Method for Determining a Physical Uplink Control Channel (PUCCH) Resource

The base station can configure one or more (up to 4) PUCCH resource sets (RESET) for each UE by using RRC signaling. A maximum number of bits of uplink control information (UCI) payload that each RESET can carry is configured or predefined by using RRC. For example, a first RESET can carry a maximum of 2 bits, a second RESET and a third RESET can carry N1 and N2 bits, respectively, and a fourth RESET can carry a maximum of 1706 bits, where N1 and N2 are configured by using RRC.

Each RESET may include a plurality of PUCCH resources. For example, the first RESET may include up to 32 PUCCH resources, and other RESETs each include up to 8 PUCCH resources.

On UE side, after receiving the PDSCH, the UE needs to feed back a HARQ-ACK. In order to determine a PUCCH resource in which the HARQ-ACK is to be fed back, the UE needs to first determine, based on K1 in the PDCCH of the scheduled PDSCH, a slot in which the PUCCH is located, and then determine, based on the number of bits of the HARQ-ACK that needs to be fed back, a RESET in which the PUCCH is located. Within the determined RESET, based on a PUCCH resource indicator (PRI) field (when the RESET includes no more than 8 resources), or a PRI and an index of a first control channel element (CCE) (First CCE Index) of the PDCCH, the UE determines a specific PUCCH resource in the RESET (when the RESET includes more than 8 resources).

When HARQ-ACKs of a plurality of PDSCHs are fed back in one slot, the UE determines the PUCCH resource based on the PRI and the CCE index in the last DCI that schedules these PDSCHs.

The following describes the resource determining method in the embodiments of this disclosure.

FIG. 1 is a flowchart of a resource determining method according to an embodiment of this disclosure. The resource determining method in this embodiment of this disclosure may be applied to a communications device. In a specific implementation, the communications device may be a terminal or a network-side device. In practical applications, the terminal may be a mobile phone, a tablet personal computer, a laptop computer, a personal digital assistant (PDA), a mobile internet device (MID), a wearable device, or an in-vehicle device. The network-side device may be a base station, a relay, or an access point.

As shown in FIG. 1, the resource determining method may include the following steps.

Step 101. Determine, based on first resource information and second resource information, a resource for a hybrid automatic repeat request HARQ feedback for downlink transmission; where the first resource information is any one of the following: a first target resource and a first resource set, where the first resource set includes at least two resources.

For ease of understanding, the following describes the first target resource in this embodiment.

In a specific implementation, the first target resource may include the following representations.

In a first representation, the first target resource may be a resource in the first resource set, which means that the first target resource may come from the first resource set, where the first resource set is determined based on a target rule.

In a second representation, the first target resource may be a resource in a second resource set, which means that the first target resource may come from the second resource set, where the second resource set may be a default or predefined resource set.

In a third representation, the first target resource may be a standalone resource, independent of a resource set. For this representation, a resource set may not be obtained by the communications device.

In a specific implementation, the first target resource may be determined and indicated to a terminal by a network-side device.

Optionally, before the determining, based on first resource information and second resource information, a resource for a hybrid automatic repeat request HARQ feedback for downlink transmission, the method further includes:

transmitting third information, where the third information indicates the first target resource.

In a specific implementation, optionally, the third information may be medium access control (MAC) information, DCI, or radio resource control RRC information.

In this embodiment, after determining the resource for feedback, the communications device may transmit, on the resource for feedback, a HARQ for the downlink transmission. Specifically, for the terminal, a HARQ for the downlink transmission is fed back on the resource for feedback; and for the network-side device, the HARQ for the downlink transmission is received on the resource for feedback.

In a specific implementation, the resource for feedback may include at least one of the following: a time-domain resource for feedback; a frequency-domain resource for feedback; and a PUCCH resource for carrying the HARQ for the downlink transmission. Further, the time-domain resource for feedback may be a slot, sub-slot, sub-frame or symbol in which the HARQ for the downlink transmission is located.

The downlink transmission may be a PDSCH transmission, but is not limited thereto.

In the resource determining method of this embodiment, the communications device can determine, based on first resource information and second resource information, a resource for a hybrid automatic repeat request HARQ feedback for downlink transmission; where the first resource information is any one of the following: a first target resource and a first resource set, where the first resource set includes at least two resources, so that flexibility in determining a resource for a HARQ feedback can be improved.

In this embodiment, the second resource information may have the following representations.

First representation. The second resource information is a resource offset with respect to the first target resource.

Corresponding to the first representation, the determining, based on first resource information and second resource information, a resource for a hybrid automatic repeat request HARQ feedback for downlink transmission includes:

determining, based on the first target resource and the resource offset, a target value; and determining, based on the target value, a resource for a HARQ feedback for downlink transmission.

In a specific implementation, the target value for determining a time-domain resource for feedback may be represented as a value of K1. The target value for determining a frequency-domain resource for feedback, the target value may be represented as a value of F1. The target value for determining a PUCCH resource within one time unit may be represented as PRI1, and PRI is used to indicate the PUCCH resource within one time unit. The time unit may be a slot, sub-slot, sub-frame or symbol.

For ease of understanding, the following describes determining of a time-domain resource for feedback, a frequency-domain resource for feedback, and a PUCCH resource, respectively.

1. Determining of a Time-Domain Resource for Feedback

For determining of a time-domain resource for feedback, the first target resource is denoted as k2, and the resource offset is denoted as $\Delta k$.

K1, k2, and $\Delta k$ satisfy the following relationship: K1=k2+$\Delta k$.

After a value of K1 is determined, the communications device may determine a time-domain resource for a HARQ feedback for downlink transmission in combination with a time location in which the terminal received the downlink transmission.

Optionally, a unit of K1, k2, and $\Delta k$ may be the same as a unit for the time location in which the terminal received the downlink transmission. For example, if the unit for the time location in which the terminal received the downlink transmission is slot, the unit of K1, k2, and $\Delta k$ also is slot. However, it should be understood that the time unit may be another representation such as a symbol or a sub-frame, which may be determined based on an actual requirement. This is not limited in the embodiments of this disclosure.

The time location in which the terminal received the downlink transmission is denoted as m, and the time-domain resource for the HARQ feedback for the downlink transmission is denoted as T, so that T=m+K1=m+k2+$\Delta k$, where a unit of T is the same as a unit for the time location in which the terminal received the downlink transmission.

For example, it is assumed that the unit for the time location in which the terminal received the downlink transmission is slot. If the terminal received the downlink transmission in slot m, a location for the HARQ feedback for the downlink transmission is slot (m+k2+$\Delta k$).

2. Determining of a Frequency-Domain Resource for Feedback

For determining of a frequency-domain resource for feedback, the first target resource is denoted as f2, and the resource offset is denoted as $\Delta f$.

F1, f2, and $\Delta f$ satisfy the following relationship: F1=f2+$\Delta f$.

Optionally, a unit of f2 and Δf may be the same as a unit of F1.

After a value of F is determined, the communications device may determine a frequency-domain resource for a HARQ feedback for downlink transmission in combination with a frequency-domain resource for receiving the downlink transmission by the terminal.

3. Determining of a PUCCH Resource

For determining of a PUCCH resource, the first target resource is denoted as PRI2, and the resource offset is denoted as ΔPRI.

PRI1, PRI2 and ΔPRI satisfy the following relationship: PRI1=PRI2+ΔPRI.

In practical applications, the communications device may first determine, based on the number of bits of a HARQ, a target RESET. Then, a target resource within the target RESET is determined based on PRI1, and the target resource is a frequency-domain resource for a HARQ feedback.

For the first representation, the second resource information may be determined at least by using the following two manners.

Manner 1. Before the determining, based on first resource information and second resource information, a resource for a hybrid automatic repeat request HARQ feedback for downlink transmission, the method further includes:

determining, based on an arrangement location of first information of a terminal in a downlink message, the resource offset; where the downlink message includes first information of N terminals, where N is an integer greater than 1.

In the manner 1, the terminal and the network-side device may separately determine, based on an arrangement location of first information of a terminal in a downlink message, the resource offset. It should be noted that, to ensure that the resource offsets determined by the terminal and the network-side device are the same, the terminal and the network-side device determine, based on the arrangement location, the resource offset in a same manner.

In a specific implementation, the communications device may use a preset rule to determine, based on the arrangement position of the first information of the terminal in the downlink message, the resource offset. In the preset rule, resource offset of the j-th terminal group=resource offset of the (j−1)-th terminal group+b. According to an arrangement order of first information of N terminals in the downlink message, the N terminals are divided in units of P terminals to obtain Q terminal groups, where Q is a rounding-up value of N/P; the resource offset for the first terminal group is 0; and j is an integer greater than 1 and less than or equal to Q. It should be understood that a resource offset is the same for each terminal in a same terminal group.

For ease of understanding, an example is described as follows.

It is assumed that the N terminals include terminal 1, terminal 2, terminal 3, terminal 4 and terminal 5, and an arrangement order of first information of the N terminals in the downlink message is: first information of terminal 1, first information of terminal 2, first information of terminal 3, first information of terminal 4, and first information of terminal 5; and that P is 2. Then the N terminals can be divided into 3 terminal groups, where the first terminal group includes terminal 1 and terminal 2, the second terminal group includes terminal 3 and terminal 4, and the third terminal group includes terminal 5.

According to a preset rule, a resource offset for the first terminal group is 0, so that the offsets for terminal 1 and terminal 2 are both 0; a resource offset for the second terminal group is b, and the offset for terminal 3 and terminal 4 are both b; and a resource offset for the third terminal group is 2b, so that the resource offset for terminal 5 is 2b.

It should be noted that a value of P in the process of determining a time-domain resource for feedback by using the preset rule may be different from or the same as a value of P in the process of determining a frequency-domain resource for feedback by using the preset rule. A value of b in the process of determining a time-domain resource for feedback by using the preset rule may be different from or the same as a value of b in the process of determining a frequency-domain resource for feedback by using the preset rule. In practical applications, P can be configured by a network-side device or predetermined by a protocol; and b may also be configured by the network-side device or predetermined by the protocol.

In practical applications, the preset rule is configured by a network-side device or is specified by a protocol. In addition, the preset rule may have many representations. Optionally, in a case that the arrangement location of the first information of the terminal in the downlink message is the i-th arrangement location, the resource offset Δk(i) is calculated according to the following equation:

$$\Delta k(i) = [(\text{floor}((i-1)/P)) \times b] \bmod N;$$

where b is an adjustment step size, and P is a positive integer.

The foregoing floor function is a rounding-down function, and the foregoing mod function is a remainder function.

It should be noted that the foregoing equation is only an example, and in another implementation, the preset rule may alternatively be expressed by another calculation equation, which may be determined based on an actual requirement. This is not limited in the embodiments of this disclosure.

Optionally, the downlink message may be a random access response message in a random access procedure. Specifically, the downlink message may be the MsgB in a 2-step random access procedure. The first information may be a random access response RAR included in a random access response message, and specifically, may be the random access response (for example, success RAR) included in the MsgB.

Manner 2. Before the determining, based on first resource information and second resource information, a resource for a hybrid automatic repeat request HARQ feedback for downlink transmission, the method further includes:

performing transmission of second information, where the second information is used to indicate the resource offset.

In the manner 2, the resource offset may be determined and indicated to a terminal by a network-side device.

Therefore, for the network-side device, the transmitting second information may specifically be: sending the second information; and for the terminal, the transmitting second information may specifically be: receiving the second information.

It should be noted that in practical applications, the second information may carry the resource offsets for M terminals, and M is a positive integer. Further, in a case that M is greater than 1, the resource offsets for different terminals may be different. Certainly, the resource offsets for some terminals may alternatively be the same, which may be specifically determined based on an actual situation. This is not limited in the embodiments of this disclosure.

In a case that M is greater than 1, a first terminal may determine, based on a resource offset corresponding to the first terminal in the second information, a resource for the HARQ feedback for the downlink transmission.

In addition, in the manner 2, the resource offset may be a value or a range.

In a case that the resource offset is a range, as can be learned from the foregoing, a resource for feedback determined based on the resource offset is also a range. In this way, in a case of HARQ feedback failure, the communications device may directly retransmit a HARQ on the resource for feedback, without need to determine the resource for feedback, so that HARQ transmission efficiency can be improved; and in a case that the resource for feedback includes unlicensed resources, the communications device can choose to transmit a HARQ on a licensed resource included in the resource for feedback, so that a success rate of the HARQ transmission can be improved.

Optionally, the second information may be MAC information. In a specific implementation, the second information may be carried in a random access response message corresponding to the random access procedure. Specifically, the second information may be information carried in the MsgB in a 2-step random access procedure. Further, the second information may be an RAR included in a random access response message, specifically may be a Success RAR included in the MsgB, or may be one piece of information contained in the random access response message, for indicating a resource offset.

Second representation. The second resource information is a second target resource in the first resource set.

Corresponding to the second representation, the determining, based on first resource information and second resource information, a resource for a hybrid automatic repeat request HARQ feedback for downlink transmission includes:

in a case that the first resource information is the first resource set, determining, based on a second target resource in the first resource set, a target value; and determining, based on the target value, a resource for a HARQ feedback for downlink transmission.

In a specific implementation, the determining, based on a second target resource in the first resource set, a target value may include the following two implementations.

First implementation. The determining, based on a second target resource in the first resource set, a target value includes:

determining the second target resource as the target value.

In a specific implementation, for the target value K1 that determines a time-domain resource for feedback, the second target resource is denoted as k3, and K1=k3.

For the target value F1 that determines a frequency-domain resource for feedback, the second target resource is denoted as f3, and F1=f3.

For the target value PRI1 that determines a PUCCH resource, the second target resource is denoted as PRI3, and PRI1=PRI3.

Second implementation. The determining, based on a second target resource in the first resource set, a target value includes:

determining, based on the second target resource and the resource offset, a target value.

In a specific implementation, for the target value K1 that determines a time-domain resource for feedback, the second target resource is denoted as k3, and the resource offset is denoted as Δk. K1, k3, and Δk satisfy the following relationship: K1=k3+Δk.

For the target value F1 that determines a frequency-domain resource for feedback, the second target resource is denoted as f3, and the resource offset is denoted as Δf. F1, f3, and Δf satisfy the following relationship: F1=f3+Δf.

For the target value PRI1 that determines a PUCCH resource for feedback, the second target resource is denoted as PRI3, and the resource offset is denoted as ΔPRI. PRI1=PRI3+ΔPRI.

For details about an implementation of the determining, based on the target value, a resource for a HARQ feedback for downlink transmission, reference may be made to the description in First representation. Details are not described herein again.

In practical applications, the second target resource and the first target resource may be the same or different.

This embodiment provides a new method to determine a resource set. Optionally, before the determining, based on first resource information and second resource information, a resource for a hybrid automatic repeat request HARQ feedback for downlink transmission, the method further includes:

determining, based on a target rule, the first resource set; where the target rule includes any one of the following:

a first rule, where the first rule is used to determine, based on a subcarrier spacing SCS of a terminal, the first resource set;

a second rule, where the second rule is used to determine, based on a frequency range FR of a terminal, the first resource set;

a third rule, where the third rule is used to determine, based on a radio network temporary identifier RNTI for scrambling target downlink control information DCI, the first resource set, where the target DCI is DCI for scheduling the downlink transmission; and a fourth rule, where the fourth rule is used to determine, based on a random access type of a terminal, the first resource set.

The following is a detailed description.

Case 1. The target rule includes the first rule.

For case 1, a correspondence between a subcarrier spacing (SCS) and a resource set may be predefined. Further, in the correspondence, different SCSs may correspond to different resource sets.

Optionally, the determining, based on a target rule, the first resource set includes:

determining a resource set corresponding to the SCS of the terminal as the first resource set. The SCS of the terminal may be an SCS used for uplink transmission or HARQ-ACK feedback performed by the terminal.

Case 2. The target rule includes the second rule.

For case 2, a correspondence between a frequency range (FR) and a resource set may be predefined. Further, in the correspondence, different FRs may correspond to different resource sets.

Optionally, the determining, based on a target rule, the first resource set includes:

determining a resource set corresponding to the FR of the terminal as the first resource set. The FR of the terminal may be an FR used for uplink transmission or HARQ-ACK feedback performed by the terminal.

Case 3. The target rule includes the third rule.

Optionally, the determining, based on a target rule, the first resource set includes at least one of the following:

in a case that the target DCI is scrambled by a random access radio network temporary identifier (RA-RNTI), and that the downlink transmission includes a random access response RAR (Success RAR) indicating a successful random access, determining a first target resource set as the first resource set;

in a case that the target DCI is scrambled by an RA-RNTI, and that the downlink transmission includes no RAR indicating a successful random access, determining a second target resource set as the first resource set; and in a case that the target DCI is scrambled by a temporary cell radio network temporary identifier (TC-RNTI), determining a second target resource set as the first resource set.

Case 4. The target rule includes the fourth rule.

In a specific implementation, a correspondence between a random access type and a resource set may be predefined. Further, different random access types correspond to different resource sets.

Optionally, the determining, based on a target rule, the first resource set includes at least one of the following:

in a case that the random access type of the terminal is 2-step random access, determining a second target resource set as the first resource set; and in a case that the random access type of the terminal is not 2-step random access, determining a first target resource set as the first resource set.

It should be noted that in this embodiment, in one implementation, both the first target resource set and the second target resource set may be resource sets determined based on a target rule; and in another implementation, the first target resource set may be a default or predefined resource set, and the second target resource set may be a resource set determined based on a target rule.

In addition, the second target resource in this embodiment may be the same as or different from the first target resource in this embodiment.

Third representation. The second resource information is void, which means that the second resource information makes no contribution to the determining of a resource for a HARQ feedback. This case is applicable to a case in which the first target resource is a standalone resource, independent of a resource set.

It should be noted that various optional implementations described in the embodiments of this disclosure may be implemented in combination or may be implemented separately, which is not limited in this embodiment of this disclosure.

This embodiment of this disclosure may include the following two major types of implementations.

First type of implementations. No resource offset is introduced.

The first type of implementations includes the following implementations:

First implementation. A resource for feedback is determined based on a first target resource, where the first target resource is a standalone resource, independent of a resource set; and Second implementation. A resource for feedback is determined based on a second target resource in the first resource set, where the first resource set is determined based on a target rule.

Second type of implementations. A resource offset is introduced.

The second type of implementations includes the following implementations:

Third implementation. A resource for feedback is determined based on the first target resource and the resource offset, where the first target resource is a standalone resource, independent of a resource set;

Fourth implementation. A resource for feedback is determined based on the first target resource and the resource offset, where the first target resource is a resource in a second resource set, and the second resource set is a default or predefined resource set; and Fifth implementation. A resource for feedback is determined based on the first target resource and the resource offset, where the first target resource is a resource in the first resource set, and the first resource set is determined based on a target rule.

This embodiment of this disclosure may include the following two methods.

Method 1

1) DCI indicates a first HARQ-ACK resource (K1 for short).

2) A rule that implicitly determines K1 according to a location order of a message of the UE in the MAC protocol data unit (PDU) is defined. The rule is as follows: K1 increases by X every other N UEs, where N is a predefined or network-configured value, and X is a predefined or network-configured value.

3) The UE receives a PDSCH, and obtains an actual K1 value according to the location of the message of the UE in the MAC PDU.

Within a determined K1, that is the determined time unit in which the PUCCH is located, optionally:

The DCI indicates a first PRI (PUCCH resource indicator);

A rule that implicitly determines a PRI according to a location order of a message of the UE in the MAC PDU is defined. The rule is as follows: Each UE has a different PRI, and PRI increases by Y every other UE, where Y is a predefined or network-configured value; and The UE receives a PDSCH, and obtains an actual PRI value according to the location of the message of the UE in the MAC PDU.

Method 2

For a HARQ-ACK feedback of a PDSCH before a connected state is established, a set corresponding to resources for the HARQ-ACK feedback is determined based on at least one of the following:

1) Subcarrier spacing (SCS).

Different K1 sets are defined according to SCSs. In a specific implementation, the HARQ-ACK feedback is determined based on a K1 set corresponding to an SCS used by the UE.

2) Frequency range (FR).

Different K1 sets are defined according to FRs. In a specific implementation, the HARQ-ACK feedback is determined based on a K1 set corresponding to an FR used by the UE.

3) RNTI, that is an RNTI for scrambling DCI.

If the DCI is scrambled by an RA-RNTI and the PDSCH includes a Success RAR, the HARQ-ACK feedback is to be determined based on K1 set 2;

If the DCI is scrambled by an RA-RNTI, but the PDSCH includes no Success RAR, the HARQ-ACK feedback is to be determined based on K1 set 1; and If the DCI is scrambled by a TC-RNTI, the HARQ-ACK feedback is to be determined based on K1 set 1.

(4) RACH type.

Two sets of HARQ-ACK resources are defined, which are K1 set 1 and K1 set 2. If 2-step RACH is configured, the HARQ-ACK feedback is to be determined based on K1 set 2; and if 2-step RACH is not configured, the HARQ-ACK feedback is to be determined based on K1 set 1.

For example, K1 set 1 may be a default K1 set for the related art.

Method 3

1) DCI indicates a first K1.
2) A dedicated K1' is indicated for each UE in the MAC PDU; and K1' may be a value or a set range.
3) The UE receives a PDSCH, and an obtained actual K1 is a first K1+K1' according to a dedicated K1' of the UE in the MAC PDU.

Embodiment 1

A network-side device sends DCI format 1_0 to schedule a PDSCH, and the PDSCH carries MsgB.

The MsgB includes Success RAR messages of 4 UEs, which are arranged in the order of UE1, UE2, UE3, and UE4.

UE detects the DCI in slot n. The DCI indicates that a HARQ-ACK feedback time (that is K1) is k, so that a feedback time of corresponding HARQ-ACK information needs to be determined by using slot n+k as a reference point.

A predefined rule is that K1 increases by 1 every other UE according to the arrangement order of the Success RARs in the MsgB.

For example, UE1 is the UE corresponding to the first Success RAR included in the MsgB. After receiving and decoding the MsgB, UE1 determines that UE1 is the UE corresponding to the first Success RAR included in the MsgB, and then determines, based on the rule, that a time at which the HARQ-ACK is fed back is slot n+k+0.

UE2 is the UE corresponding to the second Success RAR included in the MsgB. After receiving and decoding the MsgB, UE1 determines that UE2 is the UE corresponding to the second Success RAR included in the MsgB, and then determines, based on the rule, that a time at which the HARQ-ACK is fed back is slot n+k+1.

UE4 is the UE corresponding to the fourth Success RAR included in the MsgB. After receiving and decoding the MsgB, UE1 determines that UE4 is the UE corresponding to the fourth Success RAR included in the MsgB, and then determines, based on the rule, that a time at which the HARQ-ACK is fed back is slot n+k+3.

In another example, different frequency-domain PUCCH resources are used as examples.

UE detects the DCI in slot n. The DCI indicates that a resource for a HARQ-ACK feedback is PUCCH resource 1 (that is, a serial number is k), so that a resource for corresponding HARQ-ACK information feedback needs to be determined by using PUCCH resource 1 as a reference point at slot n+k.

A predefined rule is that k increases by 1 every other UE according to the arrangement order of the Success RARs in the MsgB.

For example, UE1 is the UE corresponding to the first Success RAR included in the MsgB. After receiving and decoding the MsgB, UE1 determines that UE1 is the UE corresponding to the first Success RAR included in the MsgB, and then determines, based on the rule, that a resource for the fed-back HARQ-ACK is PUCCH resource k+0.

UE2 is the UE corresponding to the second Success RAR included in the MsgB. After receiving and decoding the MsgB, UE1 determines that UE2 is the UE corresponding to the second Success RAR included in the MsgB, and then determines, based on the rule, that a resource for the fed-back HARQ-ACK is PUCCH resource k+1.

UE4 is the UE corresponding to the fourth Success RAR included in the MsgB. After receiving and decoding the MsgB, UE1 determines that UE4 is the UE corresponding to the fourth Success RAR included in the MsgB, and then determines, based on the rule, that a resource for the fed-back HARQ-ACK is PUCCH resource k+3.

Embodiment 2

Different subcarrier spacings corresponding to different HARQ-ACK resources are predefined as Table 1.

TABLE 1

Correspondence between an SCS and a HARQ-ACK feedback time set

| Subcarrier spacing | HARQ-ACK feedback time set |
| --- | --- |
| 15 kHz | {A1, A2, A3, A4, A5, A6, A7, A8} |
| 30 kHz | {B1, B2, B3, B4, B5, B6, B7, B8} |
| 60 kHz | {C1, C2, C3, C4, C5, C6, C7, C8} |
| 120 kHz | {D1, D2, D3, D4, D5, D6, D7, D8} |

The UE selects a corresponding HARQ-ACK feedback time set according to an SCS for an uplink feedback.

For example, an index in a HARQ-ACK feedback time set indicated in the DCI is 3, and a subcarrier spacing of a PUCCH fed back by the UE is 30 kilohertz (kHz). According to the HARQ-ACK feedback time set corresponding to 30 kHz, the HARQ feedback time is determined as B3, which means that the HARQ-ACK is fed back at slot n+B3.

Embodiment 3

A network-side device sends DCI format 1_0 to schedule a PDSCH, and the PDSCH carries MsgB.

The MsgB includes Success RAR messages of 4 UEs, which are arranged in the order of UE1, UE2, UE3, and UE4.

UE detects the DCI in slot n. The DCI indicates that a HARQ-ACK feedback time (that is K1) is k, so that a feedback time of corresponding HARQ-ACK information needs to be determined by using slot n+k as a reference point.

In the MsgB, respective HARQ-ACK feedback time K1' of UE1 to UE4 is included.

For example, K1'=a0 of UE1 is included in the MsgB. After receiving and decoding the MsgB, UE1 determines that a time at which the HARQ-ACK is fed back is slot n+k+a0.

K1'=a1 of UE2 is included in the MsgB. After receiving and decoding the MsgB, UE2 determines that a time at which the HARQ-ACK is fed back is slot n+k+a1.

K1'=a3 of UE4 is included in the MsgB. After receiving and decoding the MsgB, UE4 determines that a time at which the HARQ-ACK is fed back is slot n+k+a3.

It can be learned that the embodiment of this disclosure can more flexibly indicate the resource for the HARQ-ACK feedback of the PDSCH before the RRC connection is established.

FIG. 2 is a first structural diagram of a communications device according to an embodiment of this disclosure. As shown in FIG. 2, the communications device 200 includes:

a first determining module 201, configured to determine, based on first resource information and second resource information, a resource for a hybrid automatic repeat request HARQ feedback for downlink transmission; where the first resource information is any one of the following:

a first target resource; and a first resource set, where the first resource set includes at least two resources.

Optionally, the second resource information is a resource offset with respect to the first target resource.

Optionally, the communications device 200 further includes a second determining module, configured to: before the first determining module 201 determines, based on the first resource information and the second resource information, the resource for a hybrid automatic repeat request HARQ feedback for downlink transmission, determine, based on an arrangement location of first information of a terminal in a downlink message, the resource offset; where the downlink message includes first information of N terminals, where N is an integer greater than 1.

Optionally, the second determining module is specifically configured to:

in a case that the arrangement location of the first information of the terminal in the downlink message is the i-th arrangement location, calculate the resource offset Δk(i) according to the following equation:

$$\Delta k(i) = [(\text{floor}((i-1)/P)) \times b] \bmod N;$$

where b is an adjustment step size, and P is a positive integer.

Optionally, the communications device 200 further includes a first transmission module, configured to: before the first determining module 201 determines, based on first resource information and second resource information, a resource for a hybrid automatic repeat request HARQ feedback for downlink transmission, perform transmission of second information, where the second information is used to indicate the resource offset.

Optionally, the second information is medium access control MAC information.

Optionally, the first target resource is a resource in the first resource set.

Optionally, the second resource information is a second target resource in the first resource set.

Optionally, the communications device 200 further includes:

a third determining module, configured to: before the first determining module 201 determines, based on first resource information and second resource information, a resource for a hybrid automatic repeat request HARQ feedback for downlink transmission, determine, based on a target rule, the first resource set; where the target rule includes any one of the following:

a first rule, where the first rule is used to determine, based on a subcarrier spacing SCS of a terminal, the first resource set;

a second rule, where the second rule is used to determine, based on a frequency range FR of a terminal, the first resource set;

a third rule, where the third rule is used to determine, based on a radio network temporary identifier RNTI for scrambling target downlink control information DCI, the first resource set, where the target DCI is DCI for scheduling the downlink transmission; and a fourth rule, where the fourth rule is used to determine, based on a random access type of a terminal, the first resource set.

Optionally, the communications device 200 further includes a second transmission module, configured to: before the first determining module 201 determines, based on first resource information and second resource information, a resource for a hybrid automatic repeat request HARQ feedback for downlink transmission, transmit third information, where the third information is used to indicate the first target resource.

Optionally, the third information is MAC information, DCI, or radio resource control RRC information.

The communications device 200 is capable of implementing the processes implemented by the communications device 200 in the method embodiment of this disclosure, with the same beneficial effects achieved. To avoid repetition, details are not described herein again.

Figure 3:
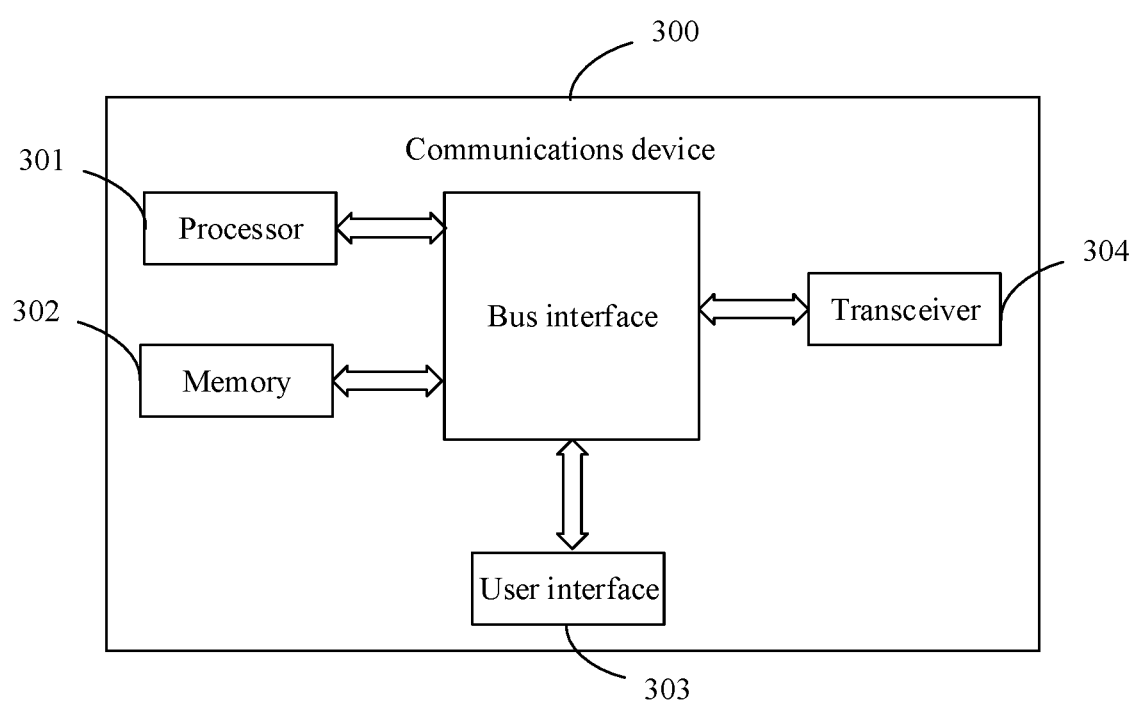
FIG. 3 is a second structural diagram of a communications device according to an embodiment of this disclosure.

FIG. 3 is a second structural diagram of a communications device according to an embodiment of this disclosure. As shown in FIG. 3, the communications device 300 includes a processor 301, a memory 302, a user interface 303, a transceiver 304, and a bus interface.

In this embodiment of this disclosure, the communications device 300 further includes a computer program stored in the memory 302 and capable of running on the processor 301. When the computer program is executed by the processor 301, the following steps are implemented:

determining, based on first resource information and second resource information, a resource for a hybrid automatic repeat request HARQ feedback for downlink transmission; where the first resource information is any one of the following:

a first target resource; and a first resource set, where the first resource set includes at least two resources.

In FIG. 3, a bus architecture may include any quantity of interconnected buses and bridges, and specifically connects together circuits that are of one or more processors represented by the processor 301 and of a memory represented by the memory 302. The bus architecture may further interconnect various other circuits such as a peripheral device, a voltage regulator, and a power management circuit. These are all well known in the art, and therefore are not further described in this specification. The bus interface provides interfaces. The transceiver 304 may be a plurality of components, including a transmitter and a receiver, and provides units for communicating with various other apparatuses on a transmission medium. For different user equipment, the user interface 303 may also be an interface that can be externally or internally connected to a required device, and the connected device includes but is not limited to a keypad, a display, a speaker, a microphone, a joystick, and the like.

The processor 301 is responsible for bus architecture management and general processing. The memory 302 may store data used when the processor 301 performs an operation.

Optionally, the second resource information is a resource offset with respect to the first target resource.

Optionally, when the computer program is executed by the processor 301, the following steps may be further implemented:

determining, based on an arrangement location of first information of a terminal in a downlink message, the resource offset; where the downlink message includes first information of N terminals, where N is an integer greater than 1.

Optionally, when the computer program is executed by the processor 301, the following steps may be further implemented:

in a case that the arrangement location of the first information of the terminal in the downlink message is the i-th arrangement location, calculating the resource offset Δk(i) according to the following equation:

$$\Delta k(i) = [(\mathrm{floor}((i-1)/P)) \times b] \mathrm{mod} N;$$

where b is an adjustment step size, and P is a positive integer.

Optionally, when the computer program is executed by the processor 301, the following steps may be further implemented:

performing transmission of second information by using the transceiver 304, where the second information is used to indicate the resource offset.

Optionally, the second information is medium access control MAC information.

Optionally, the first target resource is a resource in the first resource set.

Optionally, the second resource information is a second target resource in the first resource set.

Optionally, when the computer program is executed by the processor 301, the following steps may be further implemented:

determining, based on a target rule, the first resource set; where the target rule includes any one of the following:

a first rule, where the first rule is used to determine, based on a subcarrier spacing SCS of a terminal, the first resource set;

a second rule, where the second rule is used to determine, based on a frequency range FR of a terminal, the first resource set;

a third rule, where the third rule is used to determine, based on a radio network temporary identifier RNTI for scrambling target downlink control information DCI, the first resource set, where the target DCI is DCI for scheduling the downlink transmission; and a fourth rule, where the fourth rule is used to determine, based on a random access type of a terminal, the first resource set.

Optionally, when the computer program is executed by the processor 301, the following steps may be further implemented:

transmitting third information by using the transceiver 304, where the third information indicates the first target resource.

Optionally, the third information is MAC information, DCI, or radio resource control RRC information.

The communications device 300 can implement the processes implemented by the communications device in the foregoing method embodiments. To avoid repetition, details are not described herein again.

An embodiment of this disclosure further provides a computer-readable storage medium, where a computer program is stored in the computer readable storage medium. When the computer program is executed by a processor, the processes of the foregoing embodiments of the resource determining method are implemented, with the same technical effects achieved. To avoid repetition, details are not described herein again. For example, the computer-readable storage medium is a read-only memory (ROM), a random access memory (RAM), a magnetic disk, or an optical disc.

It should be noted that the terms "comprise", "include", or any of their variants in this specification are intended to cover a non-exclusive inclusion, such that a process, method, article, or apparatus that includes a list of elements includes not only those elements but also other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a preferred implementation. Based on such an understanding, the technical solutions of this disclosure essentially or the part thereof that contributes to related technologies may be embodied in a form of a software product. The computer software product is stored in a storage medium (for example, a ROM/RAM, a magnetic disk, or an optical disc), and includes several instructions for instructing a communications device (which may be a mobile phone, a computer, a server, an air conditioner, a network device, or the like) to perform the method described in the embodiments of this disclosure.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communication connections through some interfaces, apparatuses or units, and may be implemented in electrical, mechanical, or other forms.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable medium. Based on such an understanding, the technical solutions of this disclosure essentially, or the part contributing to the related art may be implemented in a form of a software product. The software product is stored in a storage medium, and includes several instructions for instructing a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A resource determining method, performed by a communications device and comprising:
    determining, based on first resource information and second resource information, a resource for a hybrid automatic repeat request (HARQ) feedback for downlink transmission; wherein
    the first resource information comprises:
    a first resource set, wherein the first resource set comprises at least two resources;
    wherein the second resource information is a second target resource in the first resource set;
    wherein before the determining, based on first resource information and second resource information, a resource for a hybrid automatic repeat request (HARQ) feedback for downlink transmission, the method further comprises:
    determining, based on a target rule, the first resource set; wherein
    the target rule comprises a first rule, wherein the first rule is used to determine, based on a subcarrier spacing (SCS) of a terminal, the first resource set.

2. The method according to claim 1, wherein the second resource information is a resource offset with respect to the first target resource.

3. The method according to claim 2, wherein before the determining, based on first resource information and second resource information, a resource for a hybrid automatic repeat request (HARQ) feedback for downlink transmission, the method further comprises:
    determining, based on an arrangement location of first information of a terminal in a downlink message, the resource offset; wherein
    the downlink message comprises first information of N terminals, wherein N is an integer greater than 1.

4. The method according to claim 3, wherein the determining, based on an arrangement location of first information of a terminal in a downlink message, the resource offset comprises:
    in a case that the arrangement location of the first information of the terminal in the downlink message is the i-th arrangement location, calculating the resource offset $\Delta k(i)$ according to the following equation:

$$\Delta k(i) = [(\text{floor}((i-1)/P)) \times b] \bmod N;$$

wherein b is an adjustment step size, and P is a positive integer.

5. The method according to claim 2, wherein before the determining, based on first resource information and second resource information, a resource for a hybrid automatic repeat request (HARQ) feedback for downlink transmission, the method further comprises:
    performing transmission of second information, wherein the second information is used to indicate the resource offset.

6. The method according to claim 1, wherein the first target resource is a resource in the first resource set.

7. The method according to claim 1, wherein
    the target rule further comprises any one of the following:
    a second rule, wherein the second rule is used to determine, based on a frequency range (FR) of a terminal, the first resource set;
    a third rule, wherein the third rule is used to determine, based on a radio network temporary identifier (RNTI) for scrambling target downlink control information (DCI), the first resource set, wherein the target DCI is DCI for scheduling the downlink transmission; and
    a fourth rule, wherein the fourth rule is used to determine, based on a random access type of a terminal, the first resource set.

8. The method according to claim 1, wherein before the determining, based on first resource information and second resource information, a resource for a hybrid automatic repeat request (HARQ) feedback for downlink transmission, the method further comprises:
    performing transmission of third information, wherein the third information indicates the first target resource, and the third information is MAC information.

9. A communications device, comprising a processor, a memory, and a computer program stored in the memory and capable of running on the processor, wherein when the computer program is executed by the processor, steps of a resource determining method are implemented, wherein the method comprises:
    determining, based on first resource information and second resource information, a resource for a hybrid automatic repeat request (HARQ) feedback for downlink transmission; wherein
    the first resource information comprises:
    a first resource set, wherein the first resource set comprises at least two resources;
    wherein the second resource information is a second target resource in the first resource set;
    wherein before the determining, based on first resource information and second resource information, a resource for a hybrid automatic repeat request (HARQ) feedback for downlink transmission, the method further comprises:
    determining, based on a target rule, the first resource set; wherein
    the target rule comprises a first rule, wherein the first rule is used to determine, based on a subcarrier spacing (SCS) of a terminal, the first resource set.

10. The communications device according to claim 9, wherein the second resource information is a resource offset with respect to the first target resource.

11. The communications device according to claim 10, wherein before the determining, based on first resource information and second resource information, a resource for a hybrid automatic repeat request (HARQ) feedback for downlink transmission, when the computer program is executed by the processor, the processor further implements:
    determining, based on an arrangement location of first information of a terminal in a downlink message, the resource offset; wherein the downlink message comprises first information of N terminals, wherein N is an integer greater than 1.

12. The communications device according to claim 11, wherein the determining, based on an arrangement location of first information of a terminal in a downlink message, the resource offset comprises:
in a case that the arrangement location of the first information of the terminal in the downlink message is the i-th arrangement location, calculating the resource offset $\Delta k(i)$ according to the following equation:

$$\Delta k(i) = [(\text{floor}((i-1)/P)) \times b] \bmod N;$$

wherein b is an adjustment step size, and P is a positive integer.

13. The communications device according to claim 10, wherein before the determining, based on first resource information and second resource information, a resource for a hybrid automatic repeat request (HARQ) feedback for downlink transmission, when the computer program is executed by the processor, the processor further implements:
performing transmission of second information, wherein the second information is used to indicate the resource offset.

14. The communications device according to claim 9, wherein the second resource information is a second target resource in the first resource set.

15. The communications device according to claim 9, wherein
the target rule further comprises any one of the following:
a second rule, wherein the second rule is used to determine, based on a frequency range (FR) of a terminal, the first resource set;
a third rule, wherein the third rule is used to determine, based on a radio network temporary identifier (RNTI) for scrambling target downlink control information (DCI), the first resource set, wherein the target DCI is DCI for scheduling the downlink transmission; and
a fourth rule, wherein the fourth rule is used to determine, based on a random access type of a terminal, the first resource set.

16. The communications device according to claim 9, wherein before the determining, based on first resource information and second resource information, a resource for a hybrid automatic repeat request (HARQ) feedback for downlink transmission, when the computer program is executed by the processor, the processor further implements:
performing transmission of third information, wherein the third information indicates the first target resource.

17. A non-transitory computer-readable storage medium, wherein the computer-readable storage medium stores a computer program, and when the computer program is executed by a processor, steps of a resource determining method are implemented, wherein the method comprises:
determining, based on first resource information and second resource information, a resource for a hybrid automatic repeat request (HARQ) feedback for downlink transmission; wherein
the first resource information comprises:
a first resource set, wherein the first resource set comprises at least two resources;
wherein the second resource information is a second target resource in the first resource set;
wherein before the determining, based on first resource information and second resource information, a resource for a hybrid automatic repeat request (HARQ) feedback for downlink transmission, the method further comprises:
determining, based on a target rule, the first resource set; wherein
the target rule comprises a first rule, wherein the first rule is used to determine, based on a subcarrier spacing (SCS) of a terminal, the first resource set.

18. The non-transitory computer-readable storage medium according to claim 17, wherein the second resource information is a resource offset with respect to the first target resource.

19. The non-transitory computer-readable storage medium according to claim 18, wherein before the determining, based on first resource information and second resource information, a resource for a hybrid automatic repeat request (HARQ) feedback for downlink transmission, when the computer program is executed by the processor, the processor further implements:
determining, based on an arrangement location of first information of a terminal in a downlink message, the resource offset; wherein
the downlink message comprises first information of N terminals, wherein N is an integer greater than 1.

20. The non-transitory computer-readable storage medium according to claim 17, wherein
the target rule further comprises any one of the following:
a second rule, wherein the second rule is used to determine, based on a frequency range (FR) of a terminal, the first resource set;
a third rule, wherein the third rule is used to determine, based on a radio network temporary identifier (RNTI) for scrambling target downlink control information (DCI), the first resource set, wherein the target DCI is DCI for scheduling the downlink transmission; and
a fourth rule, wherein the fourth rule is used to determine, based on a random access type of a terminal, the first resource set.

* * * * *